United States Patent [19]

Law

[11] Patent Number: 4,524,220

[45] Date of Patent: Jun. 18, 1985

[54] PROCESS FOR THE PREPARATION OF SQUARAINE COMPOSITIONS IN PRESENCE OF AMINE COMPONENT

[75] Inventor: Kock-Yee Law, Fairport, N.Y.

[73] Assignee: Xerox Corporation, Stamford, Conn.

[21] Appl. No.: 588,840

[22] Filed: Mar. 12, 1984

[51] Int. Cl.³ .................. C07C 85/00; C07C 85/02; C07C 85/06

[52] U.S. Cl. .................................................. 564/307

[58] Field of Search ...................................... 564/307

[56] References Cited

U.S. PATENT DOCUMENTS

| | | | |
|---|---|---|---|
| 3,617,270 | 11/1971 | Kampfer | 96/1.7 |
| 4,353,971 | 10/1982 | Chang et al. | 430/58 |
| 4,390,610 | 6/1983 | Bowden et al. | 430/58 |
| 4,391,888 | 7/1983 | Chang et al. | 430/57 |

OTHER PUBLICATIONS

The Chemistry of Squaraines–A. Schmidt, pp. 191, 192, 197–203, 204, (1980), Oxocarbons.

White et al., "J.A.C.S.", 86, pp. 453–458, 2/1964.

*Primary Examiner*—Paul F. Shaver
*Attorney, Agent, or Firm*—E. O. Palazzo

[57] ABSTRACT

This invention is generally directed to an improved process for the preparation of squaraine compositions which comprises the reaction of squaric acid with an aromatic aniline in the presence of an aliphatic amine, wherein there results a product of reduced dark decay properties and increased charge acceptance values as compared to squaraine compositions prepared from the squaric acid process in the absence of an aliphatic amine.

9 Claims, No Drawings

PROCESS FOR THE PREPARATION OF SQUARAINE COMPOSITIONS IN PRESENCE OF AMINE COMPONENT

BACKGROUND OF THE INVENTION

This invention relates generally to improved processes for preparing squaraine compositions, and more specifically, the present invention is directed to processes for obtaining squaraine compositions with reduced dark decay characteristics, and increased charge acceptance properties, as compared to squaraines prepared from the known squaric acid processes. In one embodiment of the present invention there is provided certain known squaraine compositions of reduced dark decay characteristics, and increased charge acceptance, when these compositions are incorporated into photoconductive devices, with a process which is effected by the reaction of squaric acid and an aromatic aniline in the presence of aliphatic amines, particularly those aliphatic amines with a carbon chain length of from about 4 to about 20 carbon atoms. The squaraine compositions resulting are useful for incorporation into layered photoresponsive imaging devices which are sensitive to light in the wavelength region of from about 400 to about 1,000 nanometers. Accordingly, the resulting devices are responsive to visible light, and infrared illumination needed for laser printing, wherein for example, gallium arsenide diode lasers are selected. The specific photoresponsive device envisioned can, for example, contain situated between a photogenerating layer and a hole transport layer, or situated between a photogenerating layer, and a supporting substrate, a photoconductive composition, comprised of the squaraine compositions prepared in accordance with the process of the present invention.

Photoconductive imaging members containing specific squaraine compositions, particularly hydroxy squaraines, are well known. Moreover, the use of certain squaraine pigments in photoresponsive imaging devices is disclosed in a copending application, wherein there is described an improved photoresponsive device containing a substrate, a hole blocking layer, an optional adhesive interface layer, an inorganic photogenerating layer, a photoconductive composition capable of enhancing or reducing the intrinsic properties of the photogenerating layer, and a hole transport layer. As photoconductive compositions for this device, there can be selected various squaraine pigments, including hydroxy squaraine composition. Additionally, there is disclosed in U.S. Pat. No. 3,824,099 certain photosensitive hydroxy squaraine compositions. According to the disclosure of this patent, the squaraine compositions are photosensitive in normal electrostatographic imaging systems.

In another copending application, there is described novel squaraine compositions of matter, such as bis-9-(8-hydroxyjulolidinyl)squaraine, and the use of these compositions as imaging members. One of the imaging members contains a supporting substrate, a hole blocking layer, an optional adhesive interface layer, an inorganic photogenerating layer, a photoconducting composition layer capable of enhancing or reducing the intrinsic properties of the photogenerating layer, which compositions are comprised of the novel julolidinyl squaraines materials disclosed in the copending application, and a hole transport layer.

Disclosed in U.S. Pat. No. 3,617,270 are optically sensitized photoconductive layers which preferably contain zinc oxide as a photoconductor, the sensitivity of which remains unchanged as a result of storage, in view of the presence of 1,3 or 1,2-squaric acid methine dyes of the formula as illustrated in column 1, beginning at line 35; while U.S. Pat. No. 3,824,099, discloses sensitive xerographic devices containing a charge generating layer comprising a squaric acid methine dye, and a charge transport layer containing a tri-arylpyrazoline compound. Also known are layered photoresponsive devices with photogenerating layers and transport layers, reference U.S. Pat. No. 4,265,990. Examples of photogenerating layers disclosed in this patent include trigonal selenium, and phthalocyanines, while examples of transport layers that may be selected are comprised of certain diamines dispersed in an inactive resinous binder composition.

Processes for preparing squaraine compositions generally involve the reaction of squaric acid with an amine. Thus, for example, the novel julolidinyl squaraine compositions disclosed in the referenced copending application are prepared by the reaction at a temperature of from about 50 degrees Centigrade to about 130 degrees Centigrade of an aromatic amine and squaric acid, in a molar ratio of from about 1.5:1 to 3:1, in the presence of a mixture of an aliphatic alcohol and an optional azeotropic cosolvent. About 200 milliliters of alcohol per 0.1 mole of squaric acid are used, while from about 40 milliliters to about 4,000 milliliters of azeotropic material are selected. Illustrative examples of amine reactants include 8-hydroxyjulolidine, while examples of aliphatic alcohols selected include 1-butanol. Azeotropic materials used include aromatic compositions such as benzene and toluene.

Moreover, disclosed in U.S. Pat. No. 4,390,610, are imaging devices sensitive to the output of gallium arsenide lasers, the devices containing a polycarbonate polymer adhesive layer coating on an electrically conductive substrate, a first charge generating layer and a second charge generating layer of a hydroxy squarylium material, and a top overcoating charge transport layer. As indicated in the background disclosure of this patent, reference Column 2, beginning at line 4, prior art layered photoconductors are not entirely acceptable in the areas of light fatigue, dark fatigue, and dark decay. Similar teachings are contained in U.S. Pat. Nos. 4,353,971 and 4,391,888. These problems of high dark decay and low charge acceptance are eliminated with the squaraine compositions prepared in accordance with the process of the present invention as detailed hereinafter.

While the above processes for preparing squaraine compositions are suitable for their intended purposes, there continues to be a need for other processes wherein photoconductive squaraine compositions can be prepared. Additionally, there remains a need for simple, economical processes for preparing squaraine compositions which when incorporated into photoconductive devices, result in reduced dark decay and increased charge acceptance as compared to substantially similar squaraine compositions resulting from the squaric acid process. Further, there continues to be a need for the preparation of squaraine compositions of enhanced photosensitivity when these compositions are selected for layered photoresponsive imaging devices. Moreover, there remains a need for improved processes for preparing various known squaraine compositions which when incorporated into imaging members exhibit excellent dark decay properties, and high charge acceptance values.

SUMMARY OF THE INVENTION

It is therefore an object of the present invention to provide processes for preparing squaraine compositions.

In another object of the present invention there are provided improved processes for preparing known squaraine compositions, which when incorporated into photoresponsive devices possess excellent dark decay properties, and high charge acceptance values.

In yet another object of the present invention there are provided simple, economical processes for preparing squaraine compositions of increased photosensitivity.

In still a further object of the present invention there are provided improved processes for obtaining squaraine compositions by the known squaric acid process wherein as an additional component in the process there is selected an aliphatic amine, such as octyl amine.

In another object of the present invention, there are provided layered photoresponsive devices containing as the photoconductive composition the squaraine materials prepared in accordance with the process of the present invention.

These and other objects of the present invention are generally accomplished by providing a process for the preparation of photoconductive squaraine compositions wherein the known squaric acid reaction is accomplished in the presence of an aliphatic amine. More specifically, the process of the present invention involves reacting squaric acid with an aromatic aniline in the presence of an aliphatic amine, wherein there results squaraine compositions with reduced dark decay properties, and increased charge acceptance values as compared to substantially similar squaraines prepared from the known squaric acid process in the absence of an aliphatic amine. In one specific embodiment, the process of the present invention comprises (1) reacting squaric acid and an aromatic aniline in the presence of an alkyl amine, wherein the alkyl group contains from about 4 carbon atoms to about 20 carbon atoms, (2) heating the reaction mixture to a temperature of from about 60° C. to about 130° C. in the presence of an aliphatic alcohol and an azeotropic substance, and (3) separating the squaraine product from the reaction mixture, wherein there results a product of reduced dark decay properties and increased charge acceptance as compared to squaraine compositions prepared from the known squaric acid process in the absence of an alkyl amine.

The process of the present invention is illustrated with reference to the following specific equations:

General Reaction

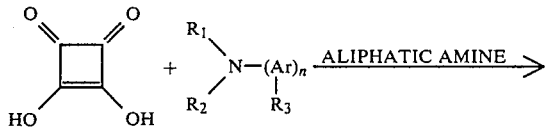

I.

-continued

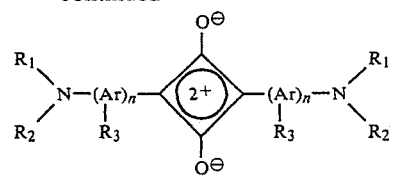

Specific Reaction

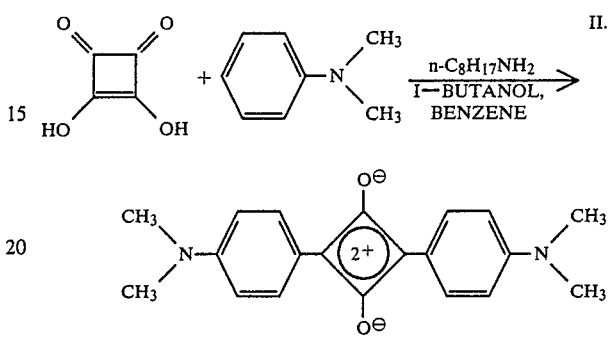

II.

wherein $R_1$ and $R_2$ are alkyl groups, and $R_3$ is an alkyl group or a halogen.

Illustrative examples of aromatic aniline reactants include N,N-dimethylaniline, N,N-diethylaniline, N,N-dipropylaniline, N,N-dibutylaniline, N,N-dipentylaniline, N,N-dihexylaniline, 3-methyl-N,N-dimethylaniline, 3-hydroxy-N,N-dimethylaniline, 3-fluoro-N,N-dimethylaniline, 3-hydroxy-N,N-diethylaniline, 3-ethyl-N,N-dimethylaniline, and the like.

Examples of aliphatic amines selected for the process of the present invention include those containing from about 4 carbon atoms to about 20 carbon atoms, such as butylamine, hexylamine, heptylamine, octylamine, decylamine, and the like, with octylamine being preferred. The process is accomplished in the presence of an aliphatic alcohol, and an optional azeotropic material, the primary function of which is to remove any undesirable water formed in the reaction mixture. Examples of aliphatic alcohols include 1-butanol, 1-pentanol, 1-hexanol, and 1-heptanol, while examples of azeotropic materials that can be selected for the process of the present invention are aromatic compositions such as benzene, toluene, and xylene.

The reaction is accomplished at a suitable temperature that will enable the desired products to form. Generally, the reaction is accomplished at the boiling point of the aliphatic alcohol, that is from about 60 degrees Centigrade to about 150 degrees Centigrade, and preferably from about 95 degrees Centigrade to about 125 degrees Centigrade.

From about 0.005 moles to about 2 moles, and preferably from about 0.01 moles to about 1 mole of squaric acid are selected for the process of the present invention, with from about 0.01 moles to about 6 moles of aromatic aniline and preferably from about 0.02 moles to about 3 moles of aromatic aniline. The amount of amine present is dependent upon a number of factors including the other reactants selected, the reaction temperature and the like. The aliphatic amine is generally added to the reaction mixture in an amount of from about 0.02 milliliters to about 124 milliliters and preferably in an amount of from about 0.08 milliliters to about 60 milliliters. Other amounts of reactants can be selected providing that the objectives of the present invention are achieved.

Illustrative examples of specific squaraine compositions that can be obtained with the process of the present invention include bis(4-dimethylaminophenyl) squaraine, bis(4-diethylaminophenyl) squaraine, bis(2-fluoro-4-dimethylaminophenyl) squaraine, bis(2-fluoro-4-diethylaminophenyl) squaraine, bis(4-dimethylamino-2-hydroxy-6-methylphenyl) squaraine, bis(2-hydroxy-4-dimethylaminophenyl) squaraine, bis(2-hydroxy-4-diethylaminophenyl) squaraine, bis(2-methyl-4-dimethylaminophenyl) squaraine, and the like. The novel fluorinated squaraine compositions prepared in accordance with the process of the present invention are described in copending application U.S. Ser. No. 558,224/83. entitled, Photoconductive Devices Containing Novel Squaraines, the disclosure of which is totally incorporated herein by reference.

The resulting products subsequent to separation from the reaction mixture, by known techniques, including filtration, were identified primarily by melting point data, infrared analysis, and visible absorption spectroscopy. Additionally, the data generated from these techniques was compared with the data available for the identical compounds prepared from the known squaric acid process. Further, elemental analysis for the respective substituents, such as analysis for carbon, hydrogen, and nitrogen, was accomplished.

The squaraine compositions prepared in accordance with the process of the present invention, are useful as photoconductive substances. Thus there can be prepared a layered photoresponsive device comprised of a supporting substrate, a hole transport layer, and situated there between a photoconductive layer, comprised of the squaraine compositions prepared in accordance with the process of the present invention. In another embodiment, the photoresponsive device envisioned is comprised of a substrate, a photoconducting layer, comprised of the squaraine compositions prepared in accordance with the process of the present invention, and situated between the photoconducting squaraine layer, and the supporting substrate, a hole transport layer. Additionally, there can be prepared photoresponsive devices useful in printing systems wherein the imaging member is comprised of a layer of the squaraine photoconductive composition prepared in accordance with the process of the present invention, situated between a photogenerating layer, and a hole transport layer, or wherein the squaraine photoconductive squaraine composition layer is situated between a photogenerating layer, and the supporting substrate of such a device. These devices are described in a copending application U.S. Ser. No. 493,114/83 entitled Photoconductive Devices Containing Novel Squaraine Compositions, the disclosure of which is totally incorporated herein by reference.

One specific improved photoresponsive device containing therein the squaraines prepared in accordance with the process of the present invention is comprised in the order stated of (1) a supporting substrate, (2) a hole blocking layer, (3) an optional adhesive interface layer, (4) an inorganic photogenerator layer, (5) a photoconductive composition layer capable of enhancing or reducing the intrinsic properties of the photogenerating layer, which composition is comprised of the squaraine materials prepared in accordance with the process of the present invention, and (6) a hole transport layer.

The photoresponsive devices or imaging members described herein can be prepared by a number of known methods, reference for example the copending applications indicated, the process parameters and the order of coating of the layers being dependent on the device desired. Thus, for example, a three layered photoresponsive device can be prepared by vacuum sublimation of the photoconducting layer on a supporting substrate, and subsequently depositing by solution coating the hole transport layer. In another process variant, a layered photoresponsive device can be prepared by providing the conductive substrate containing a hole blocking layer and an optional adhesive layer, and applying thereto by solvent coating processes, laminating processes, or other methods, a photogenerating layer, a photoconductive composition comprised of the squaraines of the present invention, which squaraines are capable of enhancing or reducing the intrinsic properties of the photogenerating layer in the infrared and/or visible range of the spectrum, and a hole transport layer.

The improved photoresponsive devices of the present invention can be incorporated into various known imaging systems, including xerographic imaging processes. Additionally, the improved photoresponsive devices of the present invention containing an inorganic photogenerating layer, and a photoconductive layer comprised of the squaraines prepared in accordance with the process of the present invention can function simultaneously in imaging and printing systems with visible light and/or infrared light. In this embodiment, the improved photoresponsive devices of the present invention may be negatively charged, exposed to light in a wavelength of from about 400 to about 1,000 nanometers, either sequentially or simultaneously, followed by developing the resulting image and transferring to paper.

The invention will now be described in detail with reference to specific preferred embodiments thereof, it being understood that these examples are intended to be illustrative only. The invention is not intended to be limited to the materials, conditions, or process parameters recited herein, it being noted that all parts and percentages are by weight unless otherwise indicated.

EXAMPLE I

There was refluxed in a mixture of benzene, 40 milliliters and 1-butanol, 40 milliliters for about 24 hours at an oil bath temperature of about 120° C., 1.14 grams, 10 millimoles, of squaric acid and 2.45 grams, about 20 millimoles of N,N-dimethylaniline. Water formed during the reaction was removed by a Dean Stark trap and subsequent to cooling, 20 milliliters of reacting solvent was removed under reduced pressure. Thereafter, 40 milliliters of anhydrous ether was added to the reaction mixture and the resulting product was filtered, washed with methanol, and ether, resulting in bis(4-dimethylaminophenyl) squaraine, 2.0 grams, a yield of 62.5 percent, which product had a melting point of 270° C. This product was identified by infrared analysis and NMR data.

A photoresponsive device was then prepared by coating on an aluminum substrate, 0.006 inch in thickness, with a coating solution containing 0.2 grams of the polycarbonate Makrolon, commercially available, 64 milligrams of the above prepared squaraine, 10 milliliters of methylene chloride and 60 grams of steel shot, which components were mixed on a paint shaker for 3 hours. This solution was coated by a 1.0 mil wet gap Bird film applicator on the aluminum substrate resulting in a photogenerating layer of bis(4-dimethylaminophenyl) squaraine, in a thickness of about 0.85 microns.

Thereafter there was applied to the squaraine photogenerating layer, a coating solution containing 4.2 grams of Makrolon polycarbonate, 31 milliliters of methylene chloride and 2.8 grams of the hole transport molecule N,N-diphenyl-N,N'-bis(3-methylphenyl) 1,1'-biphenyl-4,4'-diamine with a 5 mil Bird film applicator, followed by drying, resulting in a hole transport layer of a thickness of about 30 microns. The electrical properties of this device were then evaluated on a flat plate scanner test fixture. The results are summarized as follows:

| | |
|---|---|
| Maximum Charge Acceptance (Volts) | less than 700 |
| $V_{ddp}$ (Volts) (dark development potential) | −650 |
| Dark Decay (volt/sec) | −85 |
| $E_{0.5ddp}$ at 800 nm (ergs/cm$^2$) (energy to discharge half of the potential) | 9 |
| $E_{0.5ddp}$ at 597 nm (ergs/cm$^2$) (energy to discharge half of the potential) | 6 |

EXAMPLE II

There was prepared a bis(4-dimethylaminophenyl) squaraine, by repeating the procedure of Example I with the exception that 0.08 milliliters of octyl amine was added to the reaction mixture. The product was isolated in 58.4 percent yield and was identified as a bis(4-dimethylaminophenyl) squaraine by elemental analysis and melting point data. The melting point was 270° C.

Calculated for $C_{20}H_{20}N_2O_2$: C, 74.98; H, 6.29; N, 8.74
Found: C, 74.93; H, 6.59; N, 8.81

A photoresponsive device was then prepared by repeating the procedure of Example I with the exception that the squaraine of this Example was used as the photoconducting layer and there resulted the following:

| | |
|---|---|
| Maximum Charge Acceptance (Volts) | ∼1100 |
| Dark Development Potential (Volts) | −980 |
| Dark Decay (volt/sec) | −105 |
| Energy to discharge half of the potential (ergs/cm$^2$) | |
| at 800 nm | 10 |
| at 597 nm | 8 |

EXAMPLE III

There was prepared a bis(4-dimethylaminophenyl) squaraine, by repeating the procedure of Example I with the exception that 0.16 milliliters of octyl amine was added to the reaction mixture. The product was isolated in 60.6 percent yield and was identified as a bis(4-dimethylaminophenyl) squaraine by melting point and infrared data.

A photoresponsive device was then prepared by repeating the procedure of Example I with the exception that there was used as the photogenerating layer the bis(4-dimethylaminophenyl) squaraine prepared in this Example and there resulted the following:

| | |
|---|---|
| Maximum Charge Acceptance (Volts) | ∼1200 |
| Dark Development Potential (Volts) | −950 |
| Dark Decay (volt/sec) | −85 |
| Energy to Discharge Half of the Potential (ergs/cm$^2$) | |
| at 800 nm | 7.5 |
| at 597 nm | 6 |

EXAMPLE IV

There was prepared a bis(4-dimethylaminophenyl) squaraine, by repeating the procedure of Example I with the exception that 0.31 milliliters of octyl amine was added to the reaction mixture. The product was isolated in 42 percent yield and was identified as bis(4-dimethylaminophenyl) squaraine by melting point and infrared data.

A photoresponsive device was then prepared by repeating the procedure of Example I with the exception that there was used as the photogenerating layer the bis(4-dimethylaminophenyl) squaraine prepared in this example and there resulted the following:

| | |
|---|---|
| Maximum Charge Acceptance (Volts) | ∼1200 |
| Dark development Potential (Volts) | −950 |
| Dark Decay (volt/sec) | −110 |
| Energy to Discharge Half of the Potential (ergs/cm$^2$) | |
| at 800 nm | 7 |
| at 597 nm | 6 |

EXAMPLE V

There was prepared a bis(4-dimethylaminophenyl) squaraine, by repeating the procedure of Example I with the exception that 0.62 milliliters of octyl amine was added to the reaction mixture resulting in a product yield of 46 percent, which product was identified as a bis(4-dimethylaminophenyl) squaraine by melting point and infrared data.

A photoresponsive device was then prepared by repeating the procedure of Example I with the exception that there was used as the photogenerating layer the bis(4-dimethylaminophenyl) squaraine prepared in this example and there resulted the following:

| | |
|---|---|
| Maximum Charge Acceptance (Volts) | −900 |
| Dark development Potential (Volts) | −820 |
| Dark Decay (volt/sec) | −135 |
| Energy to Discharge Half of the Potential (ergs/cm$^2$) | |
| at 800 nm | 6.5 |
| at 597 nm | 5 |

Although the invention has been described with reference to specific preferred embodiments, it is not intended to be limited thereto, rather those skilled in the art will recognize that variations and modifications may be made therein which are within the spirit of the present invention and within the scope of the following claims.

I claim:

1. A process for the preparation of squaraine compositions which comprises the reaction of squaric acid with an aromatic aniline in the presence of an aliphatic amine, wherein there results a product of reduced dark decay properties and increased charge acceptance values as compared to squaraine compositions prepared from the squaric acid process in the absence of an aliphatic amine.

2. A process for the preparation of squaraine compositions which comprises (1) reacting squaric acid and an aromatic aniline in the presence of an alkyl amine, wherein the alkyl group contains from about 4 carbon atoms to about 20 carbon atoms, (2) heating the reaction mixture to a temperature of from about 60° C. to about 130° C. in the presence of an aliphatic alcohol and an azeotropic substance, and (3) separating the squaraine product from the reaction mixture, wherein there results a product of reduced dark decay properties and increased charge acceptance as compared to squaraine compositions prepared from the known squaric acid process in the absence of an alkyl amine.

3. A process in accordance with claim 2 wherein the aromatic aniline is N,N-dimethyaniline and there results the squaraine composition bis(4-dimethylaminophenyl) squaraine.

4. A process in accordance with claim 2 wherein the alkyl amine is octyl amine.

5. A process in accordance with claim 2 wherein the aliphatic alcohol is an alkyl alcohol, wherein the alkyl group contains from about 2 carbon atoms to about 8 carbon atoms.

6. A process in accordance with claim 2 wherein the aliphatic alcohol is 1-butanol.

7. A process in accordance with claim 2 wherein the azeotropic substance is benzene.

8. A process in accordance with claim 2 wherein the azeotropic substance is toluene.

9. A process in accordance with claim 4 wherein there results the squaraine composition bis(4-dimethylaminophenyl) squaraine.

* * * * *